June 11, 1940.                M. E. BROWN                 2,203,812
                               PAN LIFTER
                           Filed Nov. 27, 1939

INVENTOR:
Maude E. Brown
BY David E. Carlsen
   ATTORNEY.

Patented June 11, 1940

2,203,812

UNITED STATES PATENT OFFICE 2,203,812

PAN LIFTER

Maude E. Brown, St. Paul, Minn.

Application November 27, 1939, Serial No. 306,309

4 Claims. (Cl. 294—31)

My invention relates to a clamping and holding device, particularly adapted for use in kitchens, for lifting and moving open vessels such as pans and kettles not equipped with integral handles. It is therefore best designated as a pan lifter although it has further uses than lifting as will hereinafter be more fully described.

The general construction involves a pair of tongs with link connected means directed oppositely from the vicinity of its fulcrum and a pair of laterally arranged bars each with a pair of hooks, all the said (4) hooks arranged to engage inwardly the beaded rim of a pan or corresponding container when the tongs are closed.

The main object is to provide a simple, highly efficient, inexpensive and easily manipulated lifter of the class described, reference being had to the accompanying drawing, in which—

Figure 1:
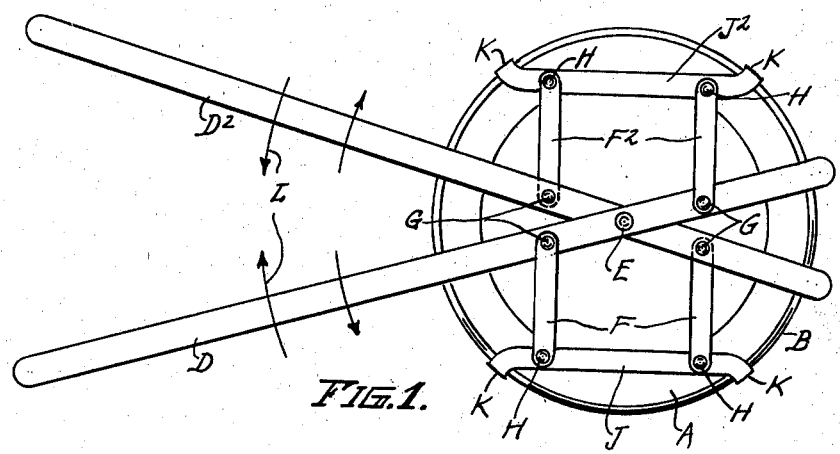
Fig. 1 is a top view of a preferred embodiment of my device in operative position clamped on the rim of a kettle.

Referring to the drawing by reference letters like characters designating corresponding parts in both figures, A designates a common type of kitchen utensil comprising a round kettle or pan with the usual perimetrical bead B comprising its top rim, this utensil representing any type of container of this class without an integral handle, although my improved device may also be used on a kettle with a handle.

My device comprises basically a pair of tongs consisting of two identical bar metal handles D—D2 crossed and pivotally connected at E comprising a rivet or equivalent thereof. Said rivet or fulcrum as illustrated is located at a distance from the front ends of the handles about one fourth of the length of the handles although this location is subject to variation.

Equidistant from the fulcrum E are pivotally connected at G to the handles D—D2 the inner ends of two pairs of horizontally disposed transversely and outwardly directed flat-bar links F—F2 of which F extend to the right and F2 to the left. The outer ends of said pairs of links are connected respectively at H to a right side flat metal bar J and a left side flat metal bar J2, both of which bars J—J2 are thus in fixed lateral relation to the handles D—D2. Both ends of said lateral bars J—J2 are formed with downwardly directed and inwardly open hooks K all said hook parts being equidistant from and concentric of the handle fulcrum E. Obviously the lateral bars are spread outwardly away from center E directly according to how much the handles D—D2 are spread and the hooks K are moved outwardly to subsequently engage the bead B inwardly when the longer arms of the handles are closed toward each other as indicated by the directional arrows L (Fig. 1).

Forward of fulcrum E the length of the handles may be such as to extend beyond the rim or bead of the pan A and over same when positioning the lifter thereon (see Fig. 1). They may however be shorter, and even terminate just ahead of the front link pivots G. One objective in having them as long as shown is to rest the front ends of the tong handles on the bead, then spread the handles and position them so that the fulcrum E will be at or about over the center of the pan the handles simultaneously being spread until the hooks K are outward of the bead. Then holding the handles firmly and closing them the four hooks K will engage the bead B inwardly and continuing to clamp the handles toward each other with one or both hands the pan can readily be lifted as for instance off of the top of a stove and the pan and contents thus readily moved about to any desired place. The grip on the pan is also sufficient to tilt the pan for draining off boiling water to either side or forwardly.

Figure 2:
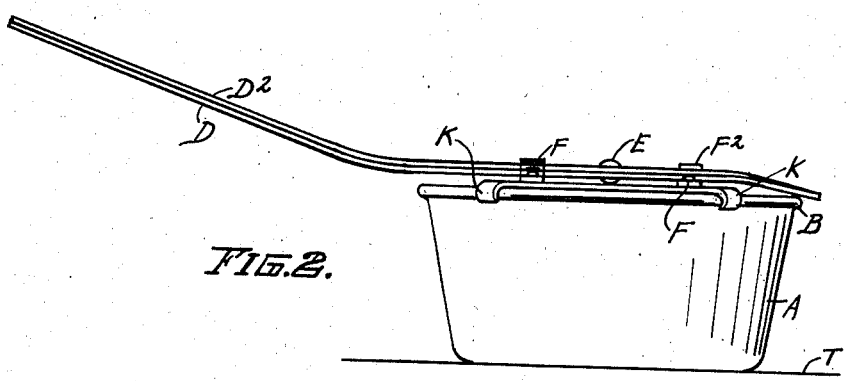
Fig. 2 is a side elevation of Fig. 1 with slight modification.

The hand hold part of the handles may be of any desired length and extend radially from the pan, and said parts outwardly of the pan rim may extend in an upward incline as shown in Fig. 2 or be offset upwardly (not shown) for the obvious reason that the operator's hands will not come too close to the stove top T.

The inner pivoted ends of the links F—F2 may have their pivots G consisting of countersunk rivets and the said link ends one on top and one on the under side of the respective handles in such manner that the handles D—D2 may be folded together and the pairs of links at each side subsequently swung either forward or back together with the lateral hook bars to lie close against or in proximity to both sides of the folded handles, this for the purpose of storing the device in the smallest possible space when not in use or for shipping purposes.

In Fig. 2 the forward ends of the handles are shown bent downwardly in a slight incline to contact the bead B simultaneously as the hooks K engage the bead, thus making a six point contact of the bead.

The use of my simple and effective pan holder has been disclosed simultaneously with the description of its construction. It will be readily understood that the device is self centering on an open vessel when the hooks K are moved inwardly by the closing action of the handles. Also it will be readily understood that one size of this device is adaptable for engaging and manipulating various sizes of pans, limited only by the effective scope of the clamping action of the main levers or handles. For example one holder device may be adaptable for and efficiently used on pans of 6" diameter up to and including pans of 9 or 10" diameter. Also sets of links F—F2 of different lengths may be provided for one pair of tongs, in which case they are removably connected at G and H.

I claim:

1. A lifter for articles such as pans and covers, comprising two pivotally connected handle bars crossing one another, a gripper bar on each side of said pivotal connection, each gripper bar having means for engaging the rim of an article to be lifted, and pairs of links connecting each gripper bar with each of the two handle bars on opposite sides of the pivot, whereby movement together of the handle bars will cause uniform movement inward of the gripper bars to grip and hold the article.

2. A lifter for articles such as pans and covers, comprising two pivotally connected handle bars crossing one another, a gripper bar on each side of said pivotal connection formed with downwardly and inwardly turned hooks at their ends for engaging the rim of an article to be lifted, and pairs of links connecting each gripper bar with each of the two handle bars on opposite sides of the pivot, whereby movement together of the handle bars will cause uniform movement inward of the gripper bars to grip and hold the article.

3. A lifter for articles such as pans and covers, comprising two pivotally connected handle bars crossing one another, a gripper bar on each side of said pivotal connection formed with downwardly and inwardly turned hooks at their ends for engaging the rim of an article to be lifted, a pair of links each pivotally connected with a separate gripper bar at a point toward its hook at one end and pivotally connected to a separate handle bar at one side of the pivot, and a second pair of links each pivotally connected to a separate gripper bar at a point towards its hook at the other end and pivotally connected to a separate other handle bar on the other side of the pivot.

4. A lifter for articles such as pans and covers, comprising two pivotally connected handle bars crossing one another with upturned long arms on one side of the pivot and short arms on the other side of the pivot, a gripper bar on each side of said pivotal connection, each gripper bar having means for engaging the rim of an article to be lifted, and pairs of links connecting each gripper bar with each of the two handle bars on opposite sides of the pivot whereby movement of the handle bars to bring the long ends together will cause uniform movement inward of the gripper bars to grip and hold the article.

MAUDE E. BROWN.